United States Patent [19]

Bestenreiner et al.

[11] 3,820,992

[45] June 28, 1974

[54] METHOD AND APPARATUS FOR RECORDING COLOR PICTURE INFORMATION ON PHOTOGRAPHIC MATERIAL

[75] Inventors: Friedrich Bestenreiner, Grunwald; Josef Helmberger, Munich; Rudolf Meyer, Leverkusen, all of Germany; Louis Achilles Meeussen, Mortsel/Antwerpen, Belgium

[73] Assignee: Agfa-Gevaert Aktiengesellschaft, Leverkusen, Germany

[22] Filed: Oct. 4, 1972

[21] Appl. No.: 294,890

[30] Foreign Application Priority Data

Oct. 6, 1971 Germany .......................... 2149843

[52] U.S. Cl. ......................... 96/27 E, 96/17, 96/23, 96/27 R, 178/5.4 CD, 178/DIG. 31

[51] Int. Cl. .......................... G03c 5/04, H04n 1/46

[58] Field of Search ...................... 96/27, 23, 24–26, 96/117–118, 59, 46, 17, 27 E; 178/5.2 R, 5.4 CD, 5.4 ES, DIG. 31

[56] References Cited

UNITED STATES PATENTS

| | | | |
|---|---|---|---|
| 2,977,407 | 3/1961 | Hirsh | 178/5.2 D |
| 3,215,030 | 11/1965 | Jordan | 96/23 X |
| 3,317,662 | 5/1967 | Robinson et al. | 178/5.4 C |

*Primary Examiner*—Ronald H. Smith
*Assistant Examiner*—Alfonso T. Suro Pico
*Attorney, Agent, or Firm*—Michael S. Striker

[57] ABSTRACT

A method of recording color picture information from an original scene on a film having a single layer of photosensitive emulsion containing a mixture of silver halide grains of different spectral sensibilities. The film is exposed in an optical camera to record a first series of monochrome images of the luminance content in the original color picture scene and a second series of monochrome images which are to represent the color content of the scene. The film is thereupon treated in a laboratory, and such treatment involves a reversal process including the exposure of a color raster onto the film portion which is provided with the second series of images. The spatial frequency of the color raster corresponds to the desired scanning frequency for the purpose of reproducing the images by color television scanning techniques.

6 Claims, 4 Drawing Figures

METHOD AND APPARATUS FOR RECORDING COLOR PICTURE INFORMATION ON PHOTOGRAPHIC MATERIAL

BACKGROUND OF THE INVENTION

The present invention relates to a method and apparatus for recording color picture information on a photographic material, and more particularly to a method and apparatus for recording on a photographic medium color picture information which can be electronically scanned and reproduced by color television scanning techniques to furnish video color signals. Still more particularly, the invention relates to improvements in a method and apparatus for recording color picture information on a carrier having a single layer of a photographic medium and wherein the recorded information includes discrete monochrome images of the luminance content in the original color picture scene and discrete chrominance images which are produced in accordance with the so-called optical carrier frequency technique and constitute encoded information pertaining to the color of the original picture scene.

It is already known to deflect a portion of incoming scene light by way of a dichroic filter which includes blue- red- and green-reflecting mirrors to form a chrominance image. The remainder of incoming scene light is used to form the monochrome image. The deflected portion of scene light passes through a raster of lenticules and is caused to impinge on a film frame. This results in the production of a chrominance image which can be scanned and reproduced in the form of an NTSC color television signal. The chrominance image includes white lines adjacent to strip images produced by light passing through the blue-, red- and green-reflecting mirrors to bring about a periodic brightening of each second color stripe. The periodicity of white lines is different from periodicity of the color stripes, and the white lines are scanned during reproduction to furnish a pilot frequency.

A drawback of the just outlined method is that the highly sensitive raster of lenticules is likely to become contaminated during transport of the photographic medium therealong. The medium must be guided with a high degree of precision at a very short distance from the lenticules of the raster. Also, the very expensive dichroic filter and raster must be provided in each camera which is used to expose the scene to form a succession of luminance and chrominance images, namely, a series of monochrome images of the luminance content and a series of encoded monochrome representations of the color content of the scene.

SUMMARY OF THE INVENTION

An object of the invention is to provide a novel and improved method of recording color picture information on black-and-white film.

Another object of the invention is to provide a method which can be practiced for recording of information on photographic film having a single layer of photosensitive emulsion and by resorting to relatively simple and inexpensive optical cameras.

A further object of the invention is to provide a method one or more critical steps of which can be carried out in a laboratory to thus insure that the conditions under which the film is being treated can be controlled with a higher degree of accuracy and reproducibility than during the exposure of photosensitive layer to scene light.

An additional object of the invention is to provide a novel and improved photographic medium and novel and improved rasters for use in the practice of the above method.

The method of the present invention is practiced by resorting to photographic film including a single layer of photosensitive emulsion containing a mixture of silver halide grains having different spectral sensitivities. Discrete first and second portions of the photosensitive layer are exposed to scene light in a still camera or motion picture camera to respectively form monochrome images of the luminance content of the original color picture scene and monochrome images which are to represent the color content of the original color picture scene. The thus exposed film is thereupon treated in a laboratory, and such treatment includes primary development and overall exposure to light in order to image on the second portion of the emulsion layer a color raster with a spatial frequency corresponding to the frequency which is desired for electronic scanning of the film for the purpose of reproducing the images by color television scanning techniques. The second exposure of the second portion of the emulsion layer insures a desirable distribution of chrominance signals in the respective monochrome images.

The color raster can be obtained by placing between the once-exposed second portion of the emulsion layer and a suitable light source a lenticular raster and by simultaneously placing between the lenticular raster and the light source a system of color stripes. The periodicity of the system of color stripes can correspond to that which is necessary for full coverage of the images on the second portion of the emulsion layer. It is then desirable to optically reduce to a smaller scale the image of the system of color stripes on the film. Such reduction of the image brings about a desirable reduction in the manufacturing cost of the system of color stripes and renders it possible to place the system of color stripes at a distance from the film path.

The emulsion layer of the film can contain a group of silver halide grains which are sensitized for red, a group of silver halide grains which are sensitized for green, and a group of unsensitized grains.

The system of color rasters which can be used for the practice of the above outlined method may include a color raster assembly comprising three boxed rectangular transparency rasters having selective transparencies red, blue and green and exhibiting identical periodicities. The impulse ratio is 1 : 3 and the mutual phase displacement is one-third of the length of a period.

The system of rasters further includes an impulse raster of white transparency and having a periodicity which is twice the periodicity of the color raster assembly and exhibits an impulse ratio of 1 : 2. The impulse raster is superimposed upon the color raster assembly during second exposure of the second portion of the emulsion layer to encode on the images of the second portion of the emulsion layer a pilot frequency.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
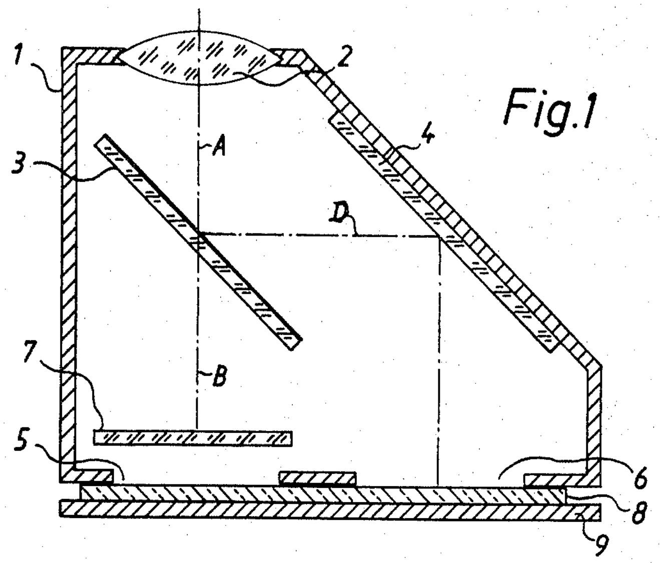
FIG. 1 is a schematic sectional view of an optical camera which can be utilized for the practice of the improved method to expose the improved film to scene light.

Referring first to FIG. 1, there is shown an optical camera which exposes two rows of images on a photographic medium 8 in the form of black-and-white film. The camera comprises a housing or body 1 supporting a lens or lens system 2 and containing a partially light-transmitting mirror 3 located in a plane making an angle of 45° with the optical axis of the lens 2. A fully reflecting second mirror 4 is mounted in the housing 1 in a plane spaced from and parallel with the plane of the mirror 3.

The camera includes two discrete frame image areas or gates 5 and 6. A filter 7 is located between the mirror 3 and the gate 5; the spectral transmissivity of the filter 7 is such that, in combination with the overall spectral sensitivity of the film 8, one obtains a black-and-white image wherein the distribution of brighter and darker areas is truly representative of the luminance content in the original color picture scene. The film 8 is held in a predetermined plane by a pressure plate 9.

The beam A of scene light entering the housing 1 by way of the lens 2 is split by the mirror 3 into two beams B and D. Thus, the camera exposes a first series of monochrome images on the film frames located behind the gate 5 and a second series of monochrome images on the film frames behind the gate 6. It is clear that the camera embodies suitable optical elements (not shown) to lengthen or shorten one of the effective optical paths between the lens 2 and the plane of the film 8 so that the latent images formed on the film behind the gates 5 and 6 are both properly focussed. The ratio of the two simultaneously formed images is preferably one-to-one.

The apparatus of FIG. 1 may constitute a still camera or a motion picture camera. If the once-exposed film 8 were exposed for a second time to diffuse white light and thereupon developed in accordance with a reversal process, one would obtain pairs of developed images which would differ only in the reproduction of the luminance content.

Figure 4:
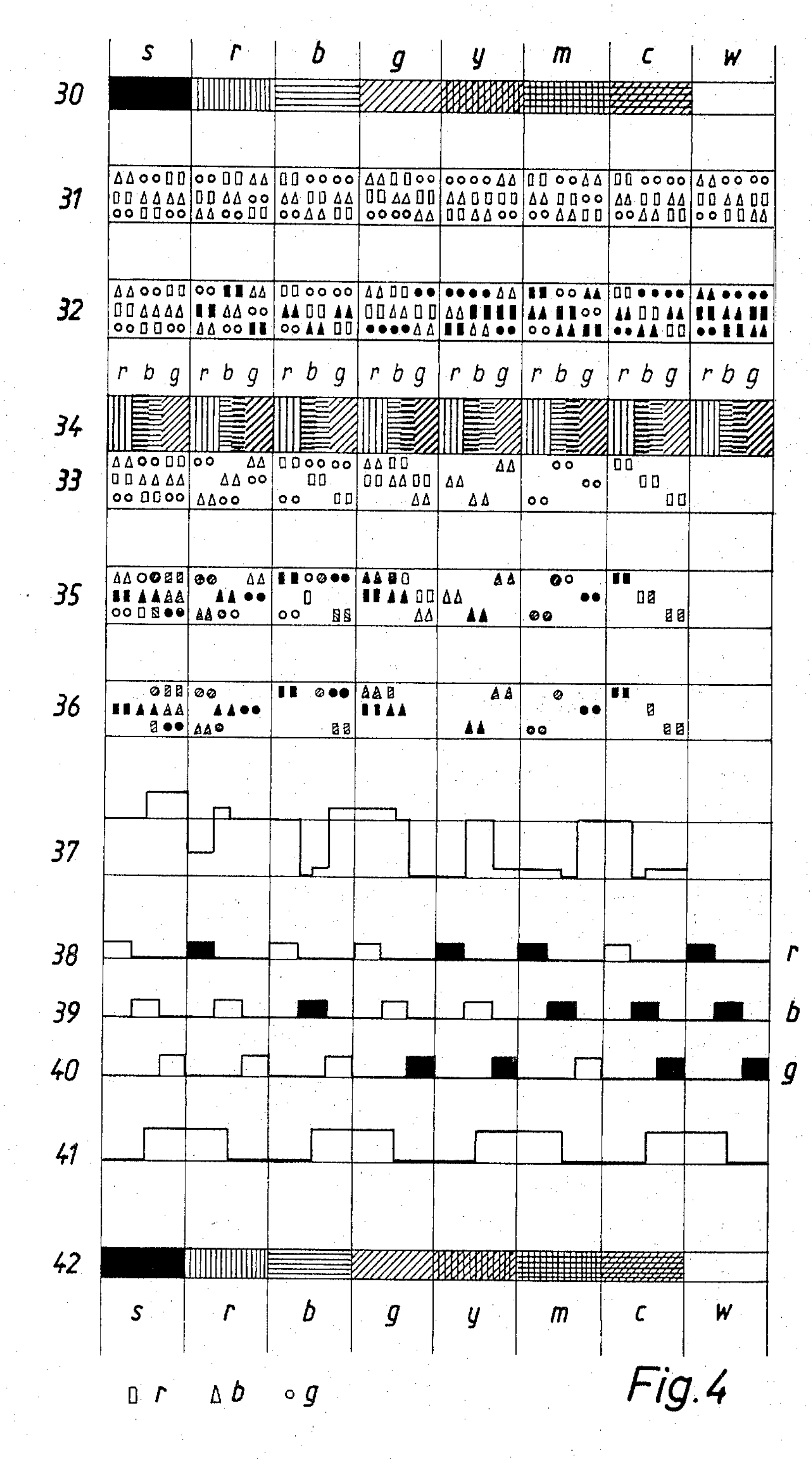
FIG. 4 is a diagram indicative of all of the steps from the exposure of an original color picture scene to the reproduction of images by a color television scanning technique.

The method steps which follow the exposure of film 8 in the photographic apparatus of FIG. 1 will be described with reference to FIG. 4. The row 30 of FIG. 4 represents a hypothetical scene having a series of adjacent color fields including a black *s*, a red *r*, a blue *b*, a green *g*, a yellow *y*, a magenta *m*, a cyan *c*, and a white *w* field. The row 31 represents a portion of the film whose single emulsion layer consists of a mixture of uniformly distributed silver halide grains having different spectral sensitivities. The grains include a first group sensitive to red, a second group sensitive to green, and a third group of unsensibilized grains. The carrier for the emulsion layer has been omitted in FIG. 4 for the sake of clarity. Thus, when the scene 30 is exposed with white light onto the emulsion layer 31 of the film 8, this results in exposure of those silver halide grains which are indicated as solid black spots in the row 32 of FIG. 4. The thus exposed film is then developed for the first time and the reduced silver of the resulting negative image is bleached and removed. As shown in the row 33 of FIG. 4, the emulsion layer of the film thereupon contains only those grains which were not exposed during the original or first exposure of film to light coming from the scene 30.

The next step includes a second exposure of film frames which were located behind the gate 5 of FIG. 1 with diffused white light to form the monochrome image of the luminance content. This results in exposure of remaining silver halide grains which are thereupon reduced in the next-following developing step. The result is a positive black-and-white image of the luminance content of the original scene.

The encoded monochrome representation of the color content of the scene 30 is obtained by exposing the film frames which were located behind the gate 5 of FIG. 1 with a color raster assembly 34 which consists of three boxed rectangular pulse rasters with selective colors red, blue and green and having identical periodicities with an impulse ratio of 1 : 3 and with a phase shift of one-third of a period. The raster assembly 34 is overlapped by a pilot frequency producing impulse raster with white transparency and having twice the periodicity of the color raster assembly 34 and an impulse ratio of 1 : 2.

The manner in which the raster assembly 34 is imaged onto the film 31 will be described with reference to FIGS. 2 and 3.

Figure 2:
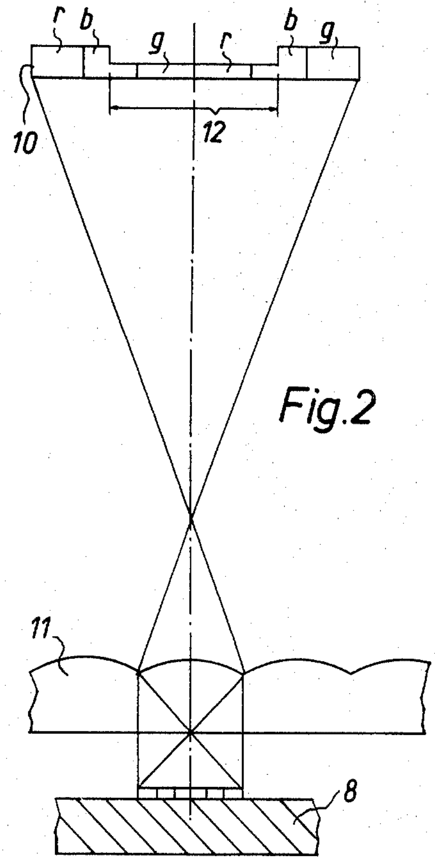
FIG. 2 illustrates one mode of exposing a color raster on the once-exposed film.

FIG. 2 shows a system 10 of six color stripes which are preferably transparent and are illuminated from behind. The system 10 is imaged by resorting to a lenticular raster 11 located in front of the emulsion side of film 8. Each elongated lenticule of the raster 11 produces on the film 8 an image of the system 10 so that the images of neighboring lenticules are adjacent to each other. The system 10 contains two periods of the color raster and comprises a zone 12 of more pronounced transparency having a width corresponding to that of one color raster period and phase-shifted relative to the color raster period by one-half the period length. Consequently, a system of white stripes having a periodicity twice the periodicity of the color raster is superimposed upon the image of the color raster on the film 8. This system of white stripes serves to furnish a pilot frequency during the scanning of film for reproduction of the color images.

Figure 3:
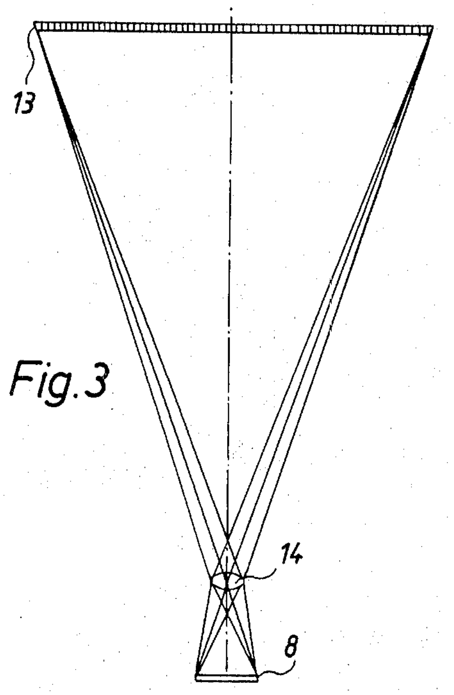
FIG. 3 illustrates another mode of exposing a color raster on the once-exposed film.

As shown in FIG. 3, the color raster 13 which is to be imaged on the film 8 to overlie the monochrome images (gate 6) can have a complete periodicity which is needed to cover the monochrome images. The color raster of FIG. 3 can be obtained by printing or by resorting to an interferometric technique. This raster also exhibits white zones. The image of the raster 13 is reduced in size by an optical system 14 and is exposed onto the film 8. The reduction is desirable because the relatively large raster 13 can be produced at a lower cost and because the raster need not be placed in actual contact with the film 8. In each instance, the raster 13 and the optical system 14 can be encapsulated to prevent entry of dust or other foreign matter.

The raster of FIG. 2 or 3 is shown in FIG. 4 at 34. The raster is imaged onto the film (see 33) which has been treated in a manner as described above. This can be achieved by arresting the film frame upon completion of each transport by a conventional film transporting mechanism. Since the raster extends in parallelism with the direction of film transport, it is also possible to image the raster while the film is in motion. It is clear that the direction of the raster must be properly related to the direction of film transport if the raster is to be imaged while the film is in motion.

The effect of imaging the raster 34 onto the film 33 is shown in FIG. 4, as at 35. Depending on the raster 34, certain additional grains of the emulsion are selectively blackened during exposure. In the whitened zones, there is obtained an additional partial blackening of all other grains as indicated by hatching in the phase 35 of FIG. 4.

The still unexposed silver halide grains are thereupon removed by fixing. The condition of the finished film is shown at 36.

The manner in which the film 8 is thereupon scanned is known in the art and, therefore, the scanning for the purpose of reproducing the color images will be described only with reference to the encoded monochrome representation of the color content. The density of the layer in dependency on the location in the direction of scanning is represented at 37. The rows 38, 39 and 40 indicate the scanning signals for the basic colors red, blue and green. These signals have a fixed phase difference relative to the pilot signal which is shown at 41. This pilot signal is obtained by scanning the overlapping white stripes in a manner well known from the art.

If the transparency of a given point which is being scanned is sufficiently high, the corresponding ray of the picture tube causes the corresponding colored dot to light up. This is indicated by the solid black sports in the rows 38, 39 and 40 of FIG. 4.

The row 37 indicates that the transparency of the three color spots of the first dot is low, i.e., there is no excitation. The picture tube screen remains black (see the back portion *s* of the original 30 in FIG. 4). The next point exhibits a high transparency for the red signal so that the screen shows a red spot (see the red portion *r* of the original 30). The situation is analogous for the scanning of the third and fourth points (blue *b* and green *g*). During the scanning of the fifth point (see the yellow portion y of the original 30), there are produced red and blue signals (see the rows 38 and 40) so that the screen exhibits a yellow spot. The other subtractive colors are obtained in similar fashion. All three colors (red, blue and green) are excited during the scanning of the eighth point (see the white portion *w* of the original 30) so that the screen shows a white spot. It will be noted that the screen reproduces a true color image of the original 30.

The improved method can be employed for direct recording of images of objects as well as for copying of color films onto photographic material which is suited for electronic scanning and reproduction.

An advantage of the method is that the critical steps (second exposure during reversal process) can be carried out in a laboratory wherein the conditions can be controlled with a higher degree of accuracy than during the exposure to scene light. Also, the optical camera is much simpler than the cameras which are used for the practice of conventional methods because the camera exposes two identical images. The color raster which is exposed onto frames recording the chrominance images need not be built into the camera.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. A method of treating a photographic film having a single layer of photosensitive emulsion so that the film can be electronically scanned and its images reproduced by color television scanning techniques, comprising the steps of providing a carrier with a single layer of photosensitive emulsion containing a mixture of silver halide grains having different spectral sensitivities; exposing discrete first and second portions of said layer to scene light to respectively form first and second monochrome images of the luminance content of the original color picture scene; and exposing on the second portion of said layer a color raster with a spatial frequency corresponding to the desired scanning frequency.

2. A method as defined in claim 1, wherein said second exposing step is carried out in a laboratory following a primary development of said first portion of said layer.

3. A method as defined in claim 1, wherein said second exposing step forms part of a reversal process.

4. A method as defined in claim 1, wherein said second exposing step comprises placing between a light source and said layer a lenticular raster and placing between said lenticular raster and said light source a system of color stripes.

5. A method as defined in claim 4, wherein the periodicity of said system of color stripes corresponds to that which is necessary for full coverage of said second portion of said layer.

6. A method as defined in claim 5, further comprising the step of optically reducing the image of said system of color stripes.

* * * * *